United States Patent Office 3,325,299
Patented June 13, 1967

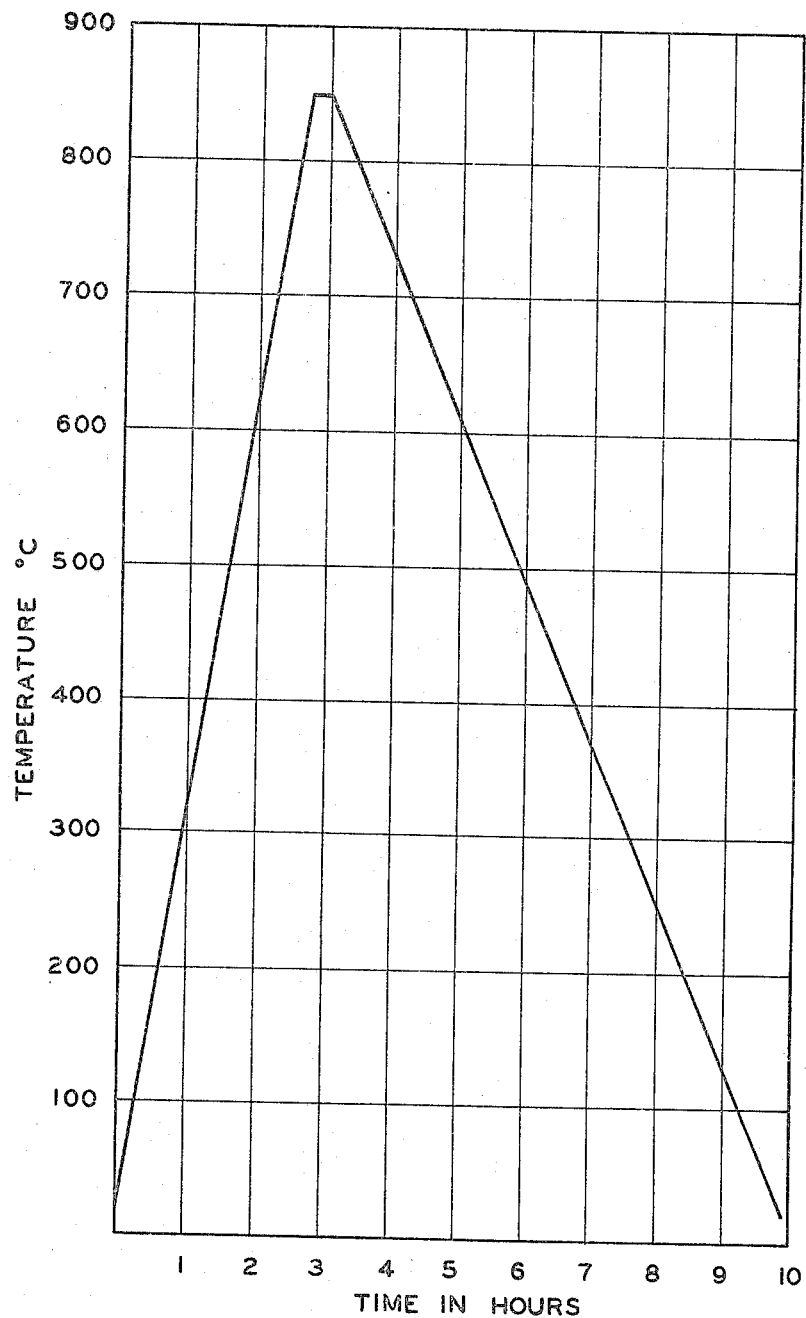

3,325,299
PHOTOTROPIC GLASS ARTICLE AND METHOD
OF MAKING IT
Roger J. Araujo, Corning, N.Y., assignor to Corning Glass
Works, Corning, N.Y., a corporation of New York
Filed May 6, 1963, Ser. No. 278,323
6 Claims. (Cl. 106—52)

This invention relates to glass compositions exhibiting phototropic properties, i.e., glass compositions whose optical transmittances vary inversely to the intensity of actinic radiation incident thereon.

In the co-pending application Ser. No. 213,634, filed July 31, 1962 by W. H. Armistead and S. D. Stookey, now Patent No. 3,208,860, issued September 28, 1965, is described some of the theoretical considerations and the practical uses of glasses possessing phototropic properties. That application discloses inorganic silicate glasses containing submicroscopic inorganic crystals which become darker in color upon exposure to actinic radiation but which regain their original color when the actinic radiation is removed. As stated therein, the reason for this effect is not clearly understood but is believed to involve a reaction between the actinic radiation and the crystals dispersed in the glassy matrix, this reaction altering the absorptive qualities of the crystals to visible radiations. However, as these crystals are dispersed in an amorphous or glassy matrix, the withdrawal of the actinic radiation permits the crystals to return to their original state since the glassy matrix is non-reactive and impermeable to the reaction products formed upon such exposure and they, therefore, cannot diffuse away. This capability of the glass to transmit more or less visible light, depending upon the intensity of actinic radiation thereon, has recommended its use in windows, walls, ophthalmic lenses, and the like. And, as was also specifically pointed out therein, the distinctive characteristic which these glasses possess with make them uniquely suitable for these applications is the ability to reversibly vary the transmittance of visible light.

A fairly wide range of compositions of base glass in the system $R_2O \cdot B_2O_3 \cdot Al_2O_3 \cdot SiO_2$, where $R_2O$ signifies the alkali metal oxides, $Li_2O$, $Na_2O$, $K_2O$, $Rb_2O$, and $Cs_2O$, was discovered to be capable of being made phototropic through the addition of silver and at least one halogen from the group consisting of chlorine, bromine, and iodine. The utility of very small amounts of low-temperature reducing agents such as SnO, FeO, $Cu_2O$, $As_2O_3$, and $Sb_2O_3$ to improve the phototropic characteristics of the glass is also disclosed as are the possible additions of fluorine, $P_2O_5$, and certain bivalent metal oxides such as MgO, CaO, BaO, SrO, ZnO, and PbO. It was observed that these bivalent metal oxides had little effect upon the phototropic properties of the glass so their presence should be limited to prevent the formation of other crystalline phases which would undesirably increase opacity and, thereby, limit the practical applications of such products.

The use of silver as the activating agent for imparting phototropicity to glass compositions has been found to be accompanied by several disadvantages. First, the sensitivity of silver-containing glasses to actinic radiation is too great for some applications, i.e., radiation of very low intensity causes substantial darkening of the glass. As an illustration of this phenomenon, sunlight falling upon such glasses in the fairly early morning, say about 8:00 a.m., will cause the glass to darken to substantially the same degree as sunlight received at high noon. It is quite obvious that a closer relationship between intensity of radiation and darkening of the glass would be beneficial in applications such as windowpanes, structural panels, eye glasses, and the like. Second, glasses containing silver often exhibit considerable temperature dependence, i.e., the amount of darkening is a function of temperature. In the usual case, the glass does not attain the same degree of darkening at high temperatures as it does at lower temperatures. Thus, changes in outdoor temperature directly affect the degree of darkening which a windowpane exhibits. Third, although having nothing to do with the chemical and physical properties of the glass, is the matter of the economics of using silver rather than a less expensive mtaerial.

The principal object, therefore, of this invention is to provide glass compositions possessing phototropic properties but which do not contain silver as the activating agent.

Another object of this invention is to provide glass compositions possessing phototropic properties wherein the variability of the optical density thereof is closely related to the intensity of the incident actinic radiation thereon.

Other objects will become apparent from the following description and the accompanying drawing which sets forth a time-temperature curve for the heat treatment of a specific embodiment of this invention.

I have discovered that these objects can be attained in an inorganic glass composition wherein copper and cadmium, or mixtures thereof, are present accompanied with at least one of the halogens of the group chlorine, bromine, and iodine. More specifically, I have discovered that a glass composition can be produced which will exhibit phototropic properties where at least about 0.3% total of the above group of cations is present within the glass, along with an amount of halogen at least equal to that required to stoichiometrically react with the metal. The metal halide crystals resulting therefrom become darker in color upon exposure to actinic radiation of wave lengths between about 0.3–0.55 micron, i.e., these crystals are sensitive to radiations of ultra-violet light and into about the middle of the visible range of the spectrum. I have discovered, further, that, as observed by Armistead and Stookey, an article which is both transparent and phototropic can be made from an inorganic glass containing such crystals which are present in a concentration of not more than about 0.1% by volume and are not more than about 0.1 micron and, preferably, 0.004–0.02 micron in diameter, there being no other crystalline phases in the glass. Thus, although the concentration and size of crystallization may be considerably greater than that set out above and the glass will still exhibit phototropic propetries, provided the crystals are fully encased in the glass to preclude permanent change therein upon exposure to actinic radiation, such greater concentrations and/or crystal sizes result in translucent or opalized glasses. The transparent glasses contain a sufficient number of such small size to have a discernible effect upon the absorption of visible radiation but to have no substantial scattering effect upon such radiation.

While it is generally feasible to determine the concentration and size of the crystals exhibiting the desired sensitivity in translucent or opal glasses by means of optical microscopy, the content and size thereof in transparent glasses must be determined by means of an electron microscope. For this purpose, I have employed a Type EMU 3–B electron microscope designed by the Radio Corporation of America and having a resolving power down to 20 Angstroms (0.002 micron). It will be understood, of course, that for some applications, for example, structure panels for buildings, a translucent or opal glass possessing phototropic properties would have great utility so, although a transparent glass is considered at present to be more useful, the value of translucent or opal glasses should not be overlooked.

Phototropic articles in accordance with this invention are produced by combining the components of the desired crystalline phase with the components of the base glass and thereafter precipitating said crystals in situ in a glass matrix. Such articles may be made from glasses of the desired composition obtained in the conventional manner by melting the required batch in a crucible, pot or tank. In order to obtain the minimum amount of required crystallinity within the final glass article, it is necessary that sufficient batch materials be utilized to yield the desired metal concentration in the glass, as determined by conventional chemical analysis thereof, such as by gravimetric or spectrophotometric methods, of at least about 0.3% by weight and a concentration of the halogen constituents of the desired halide crystal, selected from the group consisting of chlorine, bromine, iodine, and mixtures thereof, in an amount at least permitting stoichiometric reaction with the minimum amount of metal. The amounts of chlorine, bromine and iodine, on a weight basis, which are necessary for stoichiometric reaction with 0.3% of the respective metals are set out in Table I below. When mixtures of these halogens are present, it is only necessary, of course, that the total molar amounts equal the molar amount of metal available. This figure is also listed in Table I.

TABLE I

| Metal | Percent Cl | Percent Br | Percent I | Mols of Metal |
| --- | --- | --- | --- | --- |
| Cu | 0.17 | 0.38 | 0.6 | 0.0047 |
| Cd | 0.09 | 0.21 | 0.34 | 0.0027 |

As observed above, the quantity of halogen which must be present is that amount sufficient to react stoichiometrically with the minimum amount of metal necessary to induce phototropicity. Thus, it is possible to produce phototropic glasses where the metal is present far in excess of the stoichiometric reaction of metal to halogen and yet the halogen is present only in an amount sufficient to react stoichiometrically with the necessary minimum (0.3% by weight) of the metal. In like manner, where at least the minimum quantity of metal is available, the halogens may be present far in excess of the amount to stoichiometrically react therewith. However, I have learned that silicate glass compositions containing more than about 10% total of copper and/or cadmium, as analyzed on the weight percent basis, do not exhibit phototropicity. However, no advantage has been realized in utilizing more than about 2% by weight of the sensitizing metal. On the contrary, as will be demonstrated in more detail hereinafter, glasses exhibiting superior phototropicity generally contain an amount of metal slightly more than the minimum amount demanded to produce phototropicity. Laboratory work has also indicated that for practical considerations the total concentration of the three specified halogens is advantageously limited to about 3% by weight. No improvement in phototropic behavoir can be discerned with amounts greater than this and excessive halogen content can result in melting problems from seeds. The halogens are particularly subject to volatilization thereby rendering the production of homogeneous glass very difficult. Such losses may rise to 60% or more of the amount included in the batch depending upon the melting time and temperature, the type of melting unit utilized, and the initial concentration of the halogen in the melt.

The metal added like the halogen may also be lost from the batch during melting probably due to volatilization of metal halide but the amount so lost is usually less than 25% of that added. Nevertheless for any particular range of glasses the worker can easily modify the composition of the batch to compensate for such loss, and the wide latitude in the useable amounts of the essential ingredients enables the use of rough approximations for this purpose and still obtain the desired final article.

As explained above, the phototropic characteristics of the glass bodies of this invention are induced by the metal halide crystals dispersed and encased within the glassy matrix. These crystals can be precipitated upon cooling the melt to a glass body, but it is possible to cool the glass rapidly enough (quench) so that no crystallites of the desired metal halide of the proper size, or at least an insufficient number thereof, are precipitated to cause a discernible phototropic effect in the glass. The glass body is then exposed to a temperature above the strain point of the particular glass (450°–475° C.) but below about 950° C., and preferably in the range 500°–900° C., for a period of time sufficient to permit the metal cations and the halide anions to rearrange themselves within the glass body in closer proximity whereby a second amorphous phase will be formed comprising submicroscopic droplets consisting of molten metal halide which will crystallize upon cooling below the melting point of the respective metal halide. Preferably, the body should not be heated to a temperature much above the softening point of the glass to induce this additional precipitation of metal halide, because such treatment would cause excessive deformation of the glass shape unless it is adequately supported by auxiliary means during the heat treatment. Of course, it will be understood that some forming methods inherently contemplate a thermal deformation of the glass body and here, perhaps, the heat treating step could be incorporated therewith. In any event, thermal deformation becomes intolerable at temperatures much above about 950° C. This quenching of the melt followed by the designated heat treating schedule permits a more uniform growth of crystals than is possible through the precipitation of crystals during the cooling of the melt. This controlled growth of crystals leads to a more homogeneous dispersion of the crystals within the glassy matrix and more uniform sizing of the crystals themselves. The rearrangement of crystals will proceed more readily at higher temperatures principally because the viscosity of the glassy matrix decreases with an increase in temperature, thereby decreasing the resistance to movement necessary in accomplishing the rearrangement. Thus, a shorter exposure at a high temperature will effect a comparable rearrangement to that resulting from a long exposure at a lower temperature. By way of illustration rather than limitation, it has been learned that, as a general rule, exposure of the glass body to a temperature at about the strain point for a period of about 16–24 hours will yield a satisfactory development of crystals. Exposures at higher temperatures require much shorter holding periods such that only about 15 minutes at the softening point will suffice. In some instances, very short exposure periods, i.e., 5 minutes or less, have been used successfully at temperatures above the softening point of the glass. However, since there are other possible reactions which can occur during the heat treatment such as agglomeration and growth of the metal halide droplets and/or precipitation of other crystalline phases, it has been found necessary to limit the period of heat treatment at the higher portion of the operable rang in order to preclude the occurrence of these undesirable secondary reactions.

Table II sets out glass compositions which have exhibited phototropic characteristics when subjected to a suitable heat treatment, as calculated from the batch on the oxide basis in weight percent. The batch constituents may comprise any materials, either oxides or other compounds which, on being fused together, are converted to the desired oxide compositions in the desired proportions. In accordance with conventional analytical practice, although it has been determined that at least a substantial portion, if not all, of the activating metal is present in the glass as ions thereof, probably having bonds with oxygen and/or the halogens, and not as the metal itself, it is expressed in Table II as the metal.

Fluorine is added to the glass composition to improve its melting properties and to inhibit devitrification during cooling. Although metal fluoride crystals have not been detected as precipitating within the glassy phase, the quantity of fluorine is advantageously kept low in order to forestall the precipitation of other crystalline fluorides within the glass.

I have also learned that the addition of very minor amounts of low-temperature reducing agents, generally less than 1% by weight, is beneficial in improving the phototropic properties of some of the glasses. Such agents may include: tin oxide, computed as SnO; iron oxide, computed as FeO; arsenic oxide, computed as $As_2O_3$; antimony oxide, computed as $Sb_2O_3$; and sugar.

Articles were formed from the glass compositions recorded in Table II by compounding conventional batch ingredients in suitable proportions to yield the desired glass, after making the necessary allowance for the volatilization of halide and metal, ball milling these components to insure a homogeneous melt, and then melting the batch in covered crucibles for four hours at about 1400° C. The melts were then poured and rolled into plates and subsequently cooled to room temperature following a conventional annealing schedule. The plates were cooled to room temperature for visual inspection as to glass quality and the presence of phototropicity. In each instance, the quenching effect caused by the rolling of the melt into plates was sufficient to obviate the precipitation of crystallization of such an amount and size to induce any appreciable phototropicity. The plates were then subjected to heat treatment to promote a controlled growth of radiation-sensitive crystals. Nevertheless, it will be understood that the shaped glass article need not be cooled to room temperature prior to heat treatment but may be cooled to within the temperature range for heat treatment only, the heat treating step executed, and the body then cooled to room temperature. Such practice is particularly economical where the forming method contemplates the thermal deformation of the glass body as noted hereinabove. Or, further, the glass article may merely be cooled to the transformation point of the glass, i.e., that temperature at which the melt is considered to have become an amorphous solid, and then subjected to heat treatment.

|  | 1 | 2 | 3 | 4 | 5 | 6 |
|---|---|---|---|---|---|---|
| $SiO_2$ | 58.25 | 60.05 | 55.25 | 54.35 | 54.15 | 56.15 |
| $Al_2O_3$ | 9.0 | 9.0 | 9.0 | 9.0 | 9.0 | 9.0 |
| $B_2O_3$ | 20.0 | 20.0 | 20.0 | 20.0 | 20.0 | 20.0 |
| $Na_2O$ | 10.0 | 8.0 | 10.0 | 10.0 | 10.0 | 10.0 |
| F | 1.35 | 1.35 | 1.35 | 1.35 | 1.35 | 1.35 |
| Cl | 0.90 | 0.90 | 2.0 |  |  |  |
| Br |  |  |  | 4.5 | 4.5 | 2.5 |
| Cu | 0.5 | 0.7 | 0.4 | 0.3 | 0.5 | 0.5 |
| Cd |  |  | 2.0 | 0.5 | 0.5 | 0.5 |

|  | 7 | 8 | 9 | 10 | 11 | 12 |
|---|---|---|---|---|---|---|
| $SiO_2$ | 57.15 | 55.35 | 54.35 | 54.35 | 55.35 | 56.35 |
| $Al_2O_3$ | 9.0 | 9.0 | 9.0 | 9.0 | 9.9 | 9.0 |
| $B_2O_3$ | 20.0 | 20.0 | 20.0 | 20.0 | 20.0 | 20.0 |
| $Na_2O$ | 10.0 | 10.0 | 10.9 | 10.0 | 10.0 | 10.0 |
| F | 1.35 | 1.35 | 1.35 | 1.35 | 1.35 | 1.35 |
| Cl |  | 2.0 | 3.0 |  |  |  |
| Br | 1.5 |  |  | 4.5 | 3.5 | 2.5 |
| Cu | 0.5 | 0.3 | 0.3 | 0.3 | 0.3 | 0.3 |
| Cd | 0.5 | 2.0 | 2.0 | 0.5 | 0.5 | 0.5 |

|  | 13 | 14 | 15 | 16 | 17 | 18 |
|---|---|---|---|---|---|---|
| $SiO_2$ | 58.23 | 53.23 | 55.23 | 57.23 | 59.23 | 61.23 |
| $Al_2O_3$ | 9.0 | 14.0 | 12.0 | 10.0 | 8.0 | 6.0 |
| $B_2O_3$ | 20.0 | 20.0 | 20.0 | 20.0 | 20.0 | 20.0 |
| $Na_2O$ | 10.0 | 10.0 | 10.0 | 10.0 | 10.0 | 10.0 |
| F | 0.67 | 0.67 | 0.67 | 0.67 | 0.67 | 0.67 |
| Cl |  |  |  |  |  |  |
| Br | 1.5 | 1.5 | 1.5 | 1.5 | 1.5 | 1.5 |
| Cu | 0.3 | 0.3 | 0.3 | 0.3 | 0.3 | 0.3 |
| Cd | 0.3 | 0.3 | 0.3 | 0.3 | 0.3 | 0.3 |

|  | 19 | 20 | 21 | 22 | 23 | 24 |
|---|---|---|---|---|---|---|
| $SiO_2$ | 63.23 | 58.23 | 56.23 | 58.23 | 53.23 | 54.23 |
| $Al_2O_3$ | 4.0 | 9.0 | 9.0 | 9.0 | 9.0 | 8.3 |
| $B_2O_3$ | 20.0 | 18.0 | 20.0 | 15.0 | 20.0 | 18.7 |
| $Na_2O$ | 10.0 | 12.0 | 12.0 | 15.0 | 15.0 | 16.0 |
| F | 0.67 | 0.67 | 0.67 | 0.67 | 0.67 | 0.67 |
| Cl |  |  |  |  |  |  |
| Br | 1.5 | 1.5 | 1.5 | 1.5 | 1.5 | 1.5 |
| Cu | 0.3 | 0.3 | 0.3 | 0.3 | 0.3 | 0.3 |
| Cd | 0.3 | 0.3 | 0.3 | 0.3 | 0.3 | 0.3 |

|  | 25 | 26 | 27 | 28 | 29 | 30 | 31 |
|---|---|---|---|---|---|---|---|
| $SiO_2$ | 58.23 | 48.23 | 51.56 | 58.25 | 58.4 | 57.7 | 45.8 |
| $Al_2O_3$ | 9.0 | 9.0 | 8.0 | 9.0 | 9.0 | 9.0 | 7.0 |
| $B_2O_3$ | 10.0 | 20.0 | 17.9 | 20.0 | 20.0 | 20.0 | 22.6 |
| $Na_2O$ | 20.0 | 20.0 | 20.0 | 10.0 | 10.0 | 10.0 | 19.1 |
| F | 0.67 | 0.67 | 0.67 | 1.35 | 1.2 | 1.5 | 1.5 |
| Cl |  |  |  | 0.9 | 0.9 | 0.9 |  |
| Br | 1.5 | 1.5 | 1.5 |  |  |  |  |
| Cu | 0.3 | 0.3 | 0.3 | 0.5 | 0.5 | 0.9 | 1.5 |
| Cd | 0.3 | 0.3 | 0.3 |  |  |  | 0.5 |
| I |  |  |  |  |  |  | 2.0 |

To demonstrate the magnitude of the metal and halide volatilization, chemical analyses were performed on some of the glasses melted from the above batches. These analyzed compositions are recorded in Table III in weight percent.

TABLE III

|  | 1 | 15 | 17 | 19 | 22 | 25 | 31 |
|---|---|---|---|---|---|---|---|
| $SiO_2$ | 58.99 | 56.07 | 60.01 | 64.14 | 58.83 | 58.69 | 46.91 |
| $Al_2O_3$ | 9.19 | 12.15 | 8.14 | 4.02 | 9.10 | 9.09 | 7.14 |
| $B_2O_3$ | 20.31 | 20.35 | 20.29 | 20.28 | 15.19 | 10.19 | 23.15 |
| $Na_2O$ | 10.13 | 10.18 | 10.17 | 10.14 | 15.17 | 20.18 | 19.51 |
| F | 0.57 | 0.26 | 0.28 | 0.31 | 0.33 | 0.37 | 0.92 |
| Cl | 0.41 |  |  |  |  |  |  |
| Br |  | 0.52 | 0.60 | 0.63 | 0.93 | 0.98 |  |
| Cu | 0.4 | 0.23 | 0.26 | 0.24 | 0.22 | 0.25 | 1.12 |
| Cd |  | 0.24 | 0.25 | 0.24 | 0.23 | 0.25 | 0.41 |
| I |  |  |  |  |  |  | 0.84 |

As can be readily observed from a comparison of the analyzed compositions with those merely calculated from the batch ingredients, the only significant variations are in the amounts of metals and halides. Thus, the loss of copper and/or cadmium may be as high as 25% by weight while that of the halides is frequently in excess of 60% by weight.

Although many of these glasses can exhibit phototropic properties at the end of the above-described forming process, it is preferred to cool the glass shape sufficiently rapidly that extremely little, if any crystallization occurs and then subject it to a specific heat treating schedule. Table IV sets out representative heat treating schedules utilized in imparting phototropicity to several of the bodies of Table II. The heating rate employed in bringing the glass articles from room temperature to the temperature of heat treatment in most instances does not appear to critically affect the results. The articles may be plunged directly into a furnace set at the desired heat treating temperature, if the size and shape of the body is such that breakage due to thermal shock does not occur and, likewise, removed directly therefrom to cool to ambient temperature. It follows then that the articles may be heated to the desired temperature at substantially any rate at which the furnace can be heated. The articles may conveniently be cooled by merely cutting off the heat to the furnace and allowing the furnace to cool at its own rate. In Examples 1–4, the glass plates were placed in a furnace, heated at about 5° C./minute to the desired temperature, held thereat for a time sufficient to precipitate submicroscopic crystals for radiation-sensitive material, and then the heat to the furnace cut off and the furnace allowed to cool at its own rate with the plates retained therein. The glass plates of the remaining examples were simply plunged into a furnace maintained at the desired temperature, held thereat for a period of time sufficient to precipitate the necessary crystallization, and then removed from the furnace and permitted to cool to room temperature in the ambient atmosphere.

TABLE IV

| Example No.: | Heat treatment |
|---|---|
| 1 | 800° C. for ½ hour |
| 2 | 875° C. for ⅙ hour |
| 3 | 775° C. for 1 hour |
| 4 | 850° C. for ¼ hour |
| 5–19 | 700° C. for 1 hour |
| 20 | 600° C. for 7 hours |
| 21 | 550° C. for 6 hours |
| 22 | 525° C. for 8 hours |
| 23 | 525° C. for 12 hours |
| 24 | 575° C. for 6 hours |
| 25 | 625° C. for 5 hours |
| 26 | 675° C. for 3 hours |
| 27 | 650° C. for 4 hours |
| 28 | 725° C. for 1 hour |
| 29 | 750° C. for 2 hours |
| 31 | 725° C. for 2 hours |
| 30 | 500° C. for 24 hours |

A measure of the phototropic behavior of several of these glasses is set forth in Table V. This property may be demonstrated by determining the optical transmittance of the glass plate before and after exposure for a specified period to the above-described actinic radiation and again after a time interval following the termination of such exposure. In Table V, $T_0$ represents the initial visible transmission, expressed in percent, of the glass after heat treatment, i.e., the transmission to visible light of the heat treated article before exposure to actinic radiation. $T_{10}$ represents the transmission of the glass after an exposure of ten minutes to ultra-violet radiation (3650 A.) produced by a commercial "Mineralite" long wave ultra-violet lamp having a 9-watt input, the output being filtered to remove a major proportion of the visible energy. Ultra-violet radiation has been found to be extremely active in causing potentially phototropic glasses to exhibit this property. A ten-minute exposure is arbitrarily deemed to place the sample at equilibrium. $h_{ft}$ represents the half-fading time or the time in seconds at which the concentration of color centers after exposure to actinic radiation is one-half that at equilibrium. This provides a measure of the rate of fading of the darkened glass or its ability to regain its original transmission. Each of these tests was conducted at room temperature on samples 2 mm. in thickness.

TABLE V

| Example No. | $T_0$ | $T_{10}$ | $h_{ft}$ |
|---|---|---|---|
| 1 | 92.0 | 26.8 | 30 |
| 2 | 91.6 | 27.1 | 35 |
| 3 | 90.8 | 26.7 | 25 |
| 4 | 91.4 | 24.1 | 20 |
| 5 | 89.8 | 41.3 | 30 |
| 10 | 90.2 | 35.6 | 45 |
| 11 | 90.8 | 28.7 | 41 |
| 12 | 91.0 | 45.6 | 56 |
| 13 | 91.9 | 27.8 | 60 |
| 14 | 89.6 | 36.9 | 90 |
| 15 | 90.3 | 38.7 | 78 |
| 17 | 90.6 | 35.2 | 70 |
| 19 | 91.3 | 33.1 | 65 |
| 22 | 91.5 | 34.2 | 95 |
| 23 | 90.8 | 36.1 | 89 |
| 24 | 92.0 | 35.7 | 93 |
| 25 | 90.1 | 34.9 | 110 |
| 26 | 91.5 | 37.9 | 75 |

Table I Iillustrates the variations in base glass compositions which can be made phototropic through the inclusion of copper and/or cadmium with at least one halogen selected from the group consisting of chlorine, bromine, and iodine. The preferred silicate base glass compositions have been determined to be substantially equivalent to those taught by Armistead and Stookey described hereinabove, viz., glasses of the system $$R_2O \cdot B_2O_3 \cdot Al_2O_3 \cdot SiO_2$$

consisting essentially by weight of about 40–76% $SiO_2$, 4–26% $Al_2O_3$, 4–26% $B_2O_3$, and $R_2O$ is present in the indicated proportion selected from the group consisting of 2–8% $Li_2O$, 4–15% $Na_2O$, 6–20% $K_2O$, 8–25% $Rb_2O$, and 10–30% $Cs_2O$, the sum of the recited base glass constituents, metal, and halogen being at least 85% of the total glass composition. The above tables demonstrate the need for at least about 0.3% by weight total of copper and/or cadmium and an amount of halogen capable of the stoichiometric reaction with at least the minimum amount of metal.

The accompanying drawing sets forth a time-temperature graph for the heat treatment of the preferred composition, Example 4, this heat treatment representing my preferred procedure. Thus, after melting the batch, simultaneously cooling the melt to room temperature and shaping an article therefrom, hte article is placed in a furnace, heated at 5° C./minute to 850° C., held thereat for ¼ hour, the heat to the furnace cut off and thereafter the furnace allowed to cool to room temperature at its own rate (about 2° C./minute) with the article retained therein.

What is claimed is:
1. A phototropic article comprising a body of a silver-free, silicate glass having in at least a portion thereof crystals of at least one metal halide selected from the group consisting of copper chloride, copper bromide, copper iodide, cadmium chloride, cadmium bromide, cadmium iodide, and mixtures thereof, said portion of the glass containing by weight on the basis of chemical analysis, 0.3–10% total of at least one metal selected from the group consisting of copper and cadmium and a total amount of halogen selected from the group consisting of chlorine, bromine, and iodine sufficient to react stoichiometrically with at least 0.3% total of said metals.

2. A silver-free glass composition which is potentially phototropic consisting essentially, in weight percent on the analyzed basis, of 40–75% $SiO_2$, 4–26% $Al_2O_3$, 4–26% $B_2O_3$, and at least one alkali metal oxide in the indicated proportion selected from the group consisting of 2–8% $Li_2O$, 4–15% $Na_2O$, 6–20% $K_2O$, 8–25% $Rb_2O$, and 10–30% $Cs_2O$, 0.3–10% total of at least one metal selected from the group consisting of copper and cadmium, and a total amount of halogen selected from the group consisting of chlorine, bromine, and iodine sufficient to react stoichiometrically with at least 0.3% total of said metal, the sum of the recited base glass constituents, metal, and halogen being at least 85% of the total glass composition.

3. A method of manufacturing a phototropic glass body which comprises the steps of melting a batch for a silver-free, silicate glass composition, said glass composition containing, by weight on the analyzed basis, 0.3–10% total of at least one metal selected from the group consisting of copper and cadmium and a total amount of halogen selected from the group consisting of chlorine, bromine, and iodine to react stoichiometrically with at least 0.3% total of said metal, simultaneously cooling the melt and forming a glass article therefrom, subsequently heat treating said glass article at a temperature above the strain point of said glass but below about 950° C. for a time sufficient to precipitate submicroscopic crystals of radiation-sensitive material, and then cooling said article to room temperature.

4. The method according to claim 3 wherein the temperature of heat treatment ranges from about 500°–900° C.

5. The method according to claim 3 wherein the time sufficient to precipitate submicroscopic crystals of radiation-sensitive material ranges from about 5 minutes at 900° C. to about 24 hours at 500° C.

6. The method according to claim 3 wherein the submicroscopic crystals of radiation-sensitive material consist of at least one metal halide selected from the group consisting of copper chloride, copper bromide, copper iodide, cadmium chloride, cadmium bromide, and cadmium iodide.

References Cited

UNITED STATES PATENTS 2,515,940   7/1950   Stookey.
2,684,911   7/1954   Stookey _____ 65—33 X
2,971,853   2/1961   Stookey _____ 65—33 X
3,208,860   9/1965   Armistead et al. ____ 106—52 X

OTHER REFERENCES

Phototropy—A Literature Review, WADC Technical Report 59–436 of Wright Air Development Center, by Glenn H. Brown, December 1959, pages 38, 39 and 47.

DONALL H. SYLVESTER, *Primary Examiner.*

F. W. MIGA, *Assistant Examiner.*